(12) United States Patent  (10) Patent No.: US 7,802,852 B2
Siegrist et al.  (45) Date of Patent: Sep. 28, 2010

(54) SEAT FRAME SYSTEM AND METHOD OF MANUFACTURING

(75) Inventors: Ronald R. Siegrist, Grass Lake, MI (US); Robert John Hicks, Canton, MI (US); Minal Mulay, Novi, MI (US)

(73) Assignee: Johnson Controls Technology Company, Holland, MI (US)

( * ) Notice: Subject to any disclaimer, the term of this patent is extended or adjusted under 35 U.S.C. 154(b) by 360 days.

(21) Appl. No.: 11/667,724

(22) PCT Filed: Nov. 17, 2005

(86) PCT No.: PCT/US2005/041499

§ 371 (c)(1),
(2), (4) Date: Mar. 17, 2008

(87) PCT Pub. No.: WO2006/055616

PCT Pub. Date: May 26, 2006

(65) Prior Publication Data

US 2008/0265639 A1  Oct. 30, 2008

Related U.S. Application Data

(60) Provisional application No. 60/629,184, filed on Nov. 18, 2004.

(51) Int. Cl.
*A47C 7/02* (2006.01)

(52) U.S. Cl. .............................................. 297/452.18
(58) Field of Classification Search ............ 297/452.18, 297/463.2
See application file for complete search history.

(56) References Cited

U.S. PATENT DOCUMENTS

| 4,654,505 | A | | 3/1987 | Sciaky et al. |
| 5,249,841 | A | * | 10/1993 | Chales ............... 297/452.18 X |
| 6,132,003 | A | * | 10/2000 | Sakurai et al. ......... 297/452.18 |
| 7,066,552 | B2 | * | 6/2006 | Yoshida ................. 297/452.18 |
| 2004/0113481 | A1 | | 6/2004 | Saberan et al. |

FOREIGN PATENT DOCUMENTS

| EP | 0 615 798 A1 | 9/1994 |
| EP | 1 180 410 B1 | 2/2002 |
| WO | WO 2004/086909 A1 | 10/2004 |

* cited by examiner

*Primary Examiner*—Anthony D Barfield
(74) *Attorney, Agent, or Firm*—Butzel Long

(57) ABSTRACT

A seat frame for a vehicle includes a first seat frame member (34) and a second seat frame member (24). The second seat frame member (24) includes a body portion (32) and a first flexible member (70) extending from the body portion (32). The flexible member (70) is welded to the first seat frame member (34) at a first location (66) to couple the second seat frame member (26) to the first seat frame member (34).

28 Claims, 17 Drawing Sheets

SEAT FRAME SYSTEM AND METHOD OF MANUFACTURING

CROSS-REFERENCE TO RELATED APPLICATIONS

The present application claims the benefit of U.S. Provisional Patent Application No. 60/629,184 filed Nov. 18, 2004, the entire disclosure of which is incorporated by reference herein.

BACKGROUND

The present invention relates generally to the field of seat frames. More particularly, the present invention relates to the design and manufacturing of seat frames having multiple support members or components configured to be coupled together using a welding process.

A variety of seat frame systems, designs, configurations, and methods of manufacturing are used in the automotive industry. Manufacturers of seat frames continually strive to provide improved seat frame designs that can be manufactured in a more cost-efficient manner. A typical seat frame includes a plurality of structural or support members designed to be coupled or fixed together. For example, a seat frame may include a pair of side support members and at least one cross member.

Several known welding processes are used to couple or fix together support members of a seat frame. Known welding processes include, for example, resistance spot welding and gas metal arc welding (e.g., Metal Insert Gas (MIG), Tungsten Inert Gas (TIG)) processes.

Demands for improved production quality, productivity, and flexibility have caused manufacturers to seek alternatives to the above-mentioned welding processes. Laser welding has been viewed as one possible alternative. Laser welding is a non-contact welding operation in which a laser beam forms a hole, known as a "keyhole," through the workpiece to weld two or more members together. Laser welding generally allows much faster welding times than the conventional welding processes.

Known laser welding processes often involve the mounting of a laser to an end of a robot arm that must be selectively positioned substantially near each weld spot to weld the pieces together. Remote beam laser welding has been developed to decrease welding times. In a remote beam laser welding system, a single "work head" can be positioned at a predetermined distance (e.g., a standoff distance) from a workpiece. The work head includes a mirroring device configured to selectively control the path of a laser beam onto the workpiece without moving the work head. Since the time required to move a robot arm accurately into position has been eliminated with a remote beam laser welding system, the workpiece can be welded much faster. However, remote beam laser welding systems are extremely expensive, and to maximize the efficiency of remote beam laser welding, the workpiece should be designed so that it can be completely welded without repositioning the workpiece or the work head during the welding process.

Known seat frames are often designed to be welded by one particular welding process, and generally cannot be welded by an alternative welding process because of differences in the tooling requirements and/or the limitations of the welding processes. For example, if a seat frame is designed to be welded specifically by a resistant spot welding process, it is unlikely that the same design can be welded by an alternative welding process without significant redesign. In addition, known seat frames often have welds spots along varying planes, sides, surfaces, orientations, etc., which require the seat frame system to be turned, flipped, rotated, or otherwise repositioned during a welding process in order to obtain access to each weld spot.

There is a need for a seat frame that is adapted to be manufactured by a remote beam laser welding process. There is a further need to provide a seat frame system having weld spots accessible without substantially moving the members of the seat frame system and/or a work head of a remote beam laser welding system. There is also a need to provide a seat frame that can optimize the efficiency of a remote beam laser welding process by having support members that can be sufficiently clamped at the weld spots using a relatively fast-acting clamping device. There is a further need to provide a seat frame designed and optimized to be manufactured by a remote beam laser welding process, but can alternatively be manufactured in a manufacturing facility not equipped with a remote beam laser welding system. There is also a need for a seat frame, and method of manufacturing a seat frame, that is designed to be manufactured using any one or any combination of a remote beam laser welding process, a resistance spot welding process, and a gas metal arc welding process. Accordingly, to provide such seat frame and a method of manufacturing such a seat frame would represent a significant advancement in the art of seat frame systems.

SUMMARY

An exemplary embodiment relates a seat frame for a vehicle that includes a first seat frame member and a second seat frame member. The second seat frame member includes a body portion and a first flexible member extending from the body portion. The flexible member is welded to the first seat frame member at a first location to couple the second seat frame member to the first seat frame member.

Another exemplary embodiment relates to a method for producing a seat frame that includes providing a first support member and providing a second support member adjacent the first support member. The second support member includes a flexible member extending therefrom. The method also includes applying a clamping force at a first location to clamp the flexible member to the first support member and welding the flexible member to the first support member at the first location to couple the second support member to the first support member.

DETAILED DESCRIPTION

Figure 1:
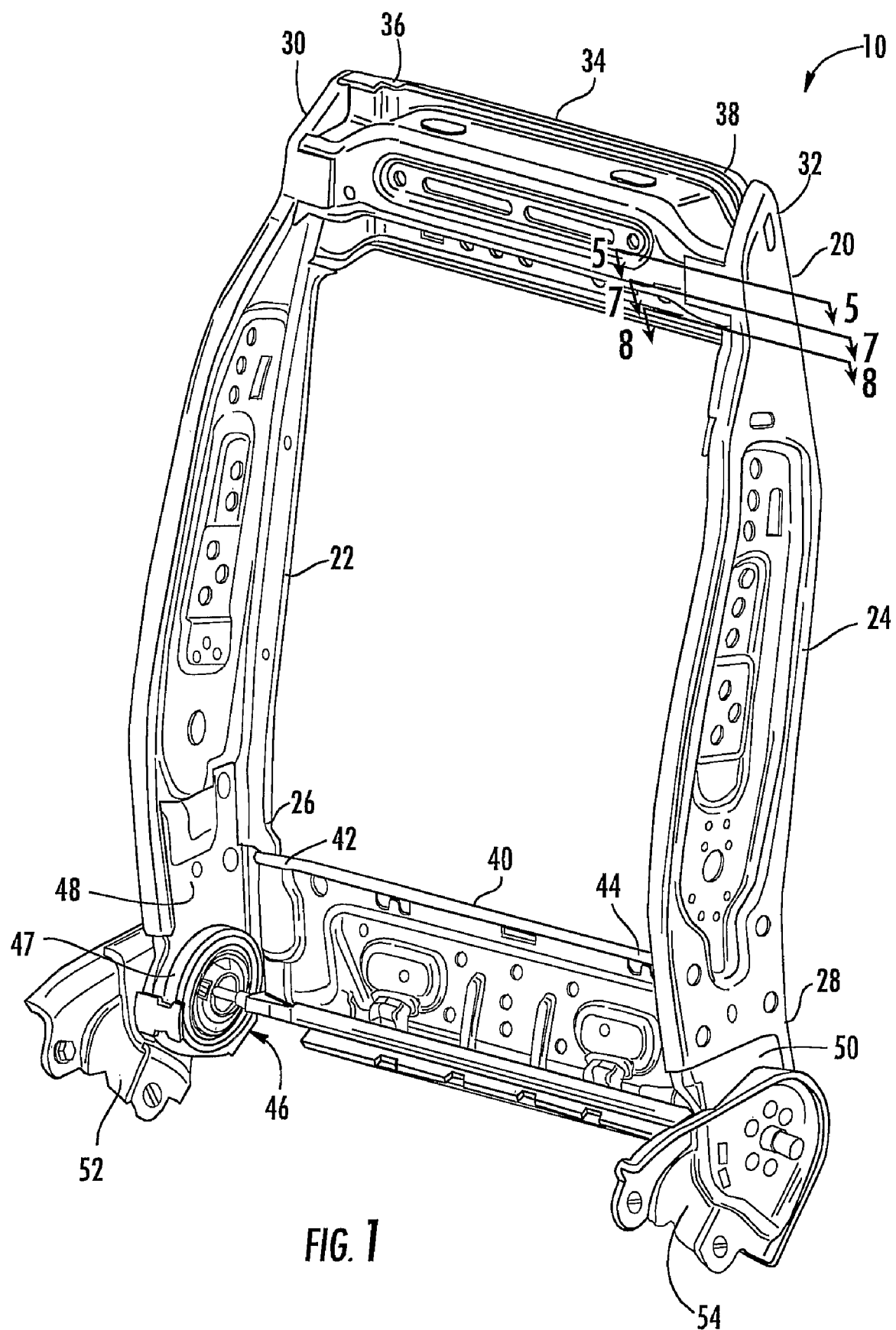
FIG. 1 is a perspective view of a seat frame system according to an exemplary embodiment.

With reference to the accompanying FIGURES generally, and in particular to FIG. 1, a seat frame system 10 is shown according to an exemplary embodiment. Seat frame system 10 comprises a plurality of members (e.g., structures, components, supports, etc.) coupled together to form a seat frame, each of which is made from steel or another metal. The members of seat frame system 10 are adapted to be coupled together using a welding process, and according to an exemplary embodiment, are capable of being welded together using any one of a variety of welding processes. For example, the members of seat frame system 10 may be designed to be welded together using at least one of the following welding processes: (1) a remote beam laser welding process; (2) a resistance spot welding process; and/or (3) a gas metal arc welding process. According to an exemplary embodiment, the members of seat frame system 10 are capable of being welded together using more than one type of welding process (independently and/or in combination). By providing flexibility in the welding process that can be used to couple the members together, seat frame system 10 can be manufactured in a variety of manufacturing environments (e.g., locations, manufacturing facilities, etc.), including manufacturing environments where certain welding processes may be economically impracticable or otherwise unavailable.

To optimize the efficiency of using a remote beam laser welding process, the seat frame system 10 includes members (e.g., side support members and a cross support member, etc.) capable of being sufficiently clamped together at a weld spot using a relatively fast-acting clamping system such as a pneumatic clamping device. To provide such a configuration, one member (e.g., a side support member) includes a portion that is relatively rigid (e.g., having similar rigidity as a conventional seat frame member, etc.), while a second member of the weld spot (e.g., a cross support member) is relatively less rigid. Providing at least one member with a relatively less rigid portion allows a desired gap width between the members to be achieved using a lesser clamping force than is conventionally necessary. The lesser clamping force can be achieved using a relatively fast-acting pneumatic clamping device rather than the conventionally used slower-acting hydraulic clamping device.

Seat frame system 10 may be employed in a variety of applications, and is generally applicable with any seating application that would benefit from more cost effective manufacture by providing flexibility in the type of welding process that can be used for manufacturing. With reference to all the FIGURES, seat frame system 10 is configured as a seat back frame for a vehicle such as a car, sport utility vehicle, mini-van, truck, etc. While the disclosed embodiments may be described and illustrated as a seat back frame for use in a vehicle, the features of the disclosed embodiments are equally applicable with other seat frame applications such as a seat bottom (i.e., base, etc.) frame configured for use in a vehicle. The features of the disclosed embodiments are suitable for use with seat assemblies positioned throughout a vehicle, including front row vehicle seating, second row vehicle seating, third row vehicle seating, and the like. The features of seat frame system 10 are also suitable for use in other vehicular applications such as airplanes, trains, buses, boats, and non-vehicular applications such as office seating, amusement ride seating, etc.

FIG. 1 is a perspective view of seat frame system 10 which generally includes an outer peripheral frame 20. According to an exemplary embodiment, frame 20 includes a pair of spaced apart side support members 22, 24 and at least one cross support member, shown as an upper or first cross support member 34 located toward second ends 30, 32 of side support members 22, 24. According to an exemplary embodiment, side support members 22, 24 have a length greater than the length of first cross support member 34 to provide a seat frame with a substantially rectangular configuration. According to various other exemplary embodiments, side support members 22, 24 may have a length substantially equal to the length of first cross support member 34, or the side support members may have a length less than the length of first cross support member 34.

According to an exemplary embodiment, side support members 22, 24 extend longitudinally (e.g., vertically, etc.) from first ends 26, 28 to second ends 30, 32 respectively, while first cross support member 34 extends in a direction substantially transverse (e.g., horizontal, lateral, perpendicular, etc.) to side support members 22, 24. Frame 20 is further shown as including a lower or second cross support member 40 extending in a direction transverse to side support members 22, 24 and located toward first ends 26, 28 of side support members 22, 24 respectively.

According to various other exemplary embodiments, frame 20 may include any number of support members extending in a number of directions such as horizontally, vertically, diagonally, etc. In one embodiment (not shown), frame 20 may include a pair of spaced apart side members and a single cross support member. In this manner, frame 20 can be configured as a U-shaped frame with the side member extending transverse to the side support members at one end. As can be appreciated, frame 20 may have a variety of known or otherwise appropriate configurations. It should further be noted that the support members of frame 20 can have any suitable number and shapes of ridges and apertures for improving the rigidity of frame 20 and/or reducing the weight.

Still referring in particular to FIG. 1, first cross support member 34 includes a first end 36 coupled substantially near and/or at second end 30 of side support member 22, and an opposite second end 38 coupled substantially near and/or at second end 32 of side support member 24. Second cross support member 40 includes a first end 42 coupled substantially near first end 26 of side support member 22, and an opposite second end 44 coupled substantially near first end 28 of side support member 24. As can be appreciated, first cross support member 34 and second cross support member 40 may be coupled to side support members 22, 24 anywhere along the length of the side support members.

For purposes of this disclosure, the term "coupled" means the joining or combining of two members directly or indirectly to one another. Such joining or combining may be achieved with the two members or the two members and any additional intermediate members being integrally formed as a single unitary body with one or another or with the two members or the two members and any additional intermediate member being attached to one another.

Figure 3:
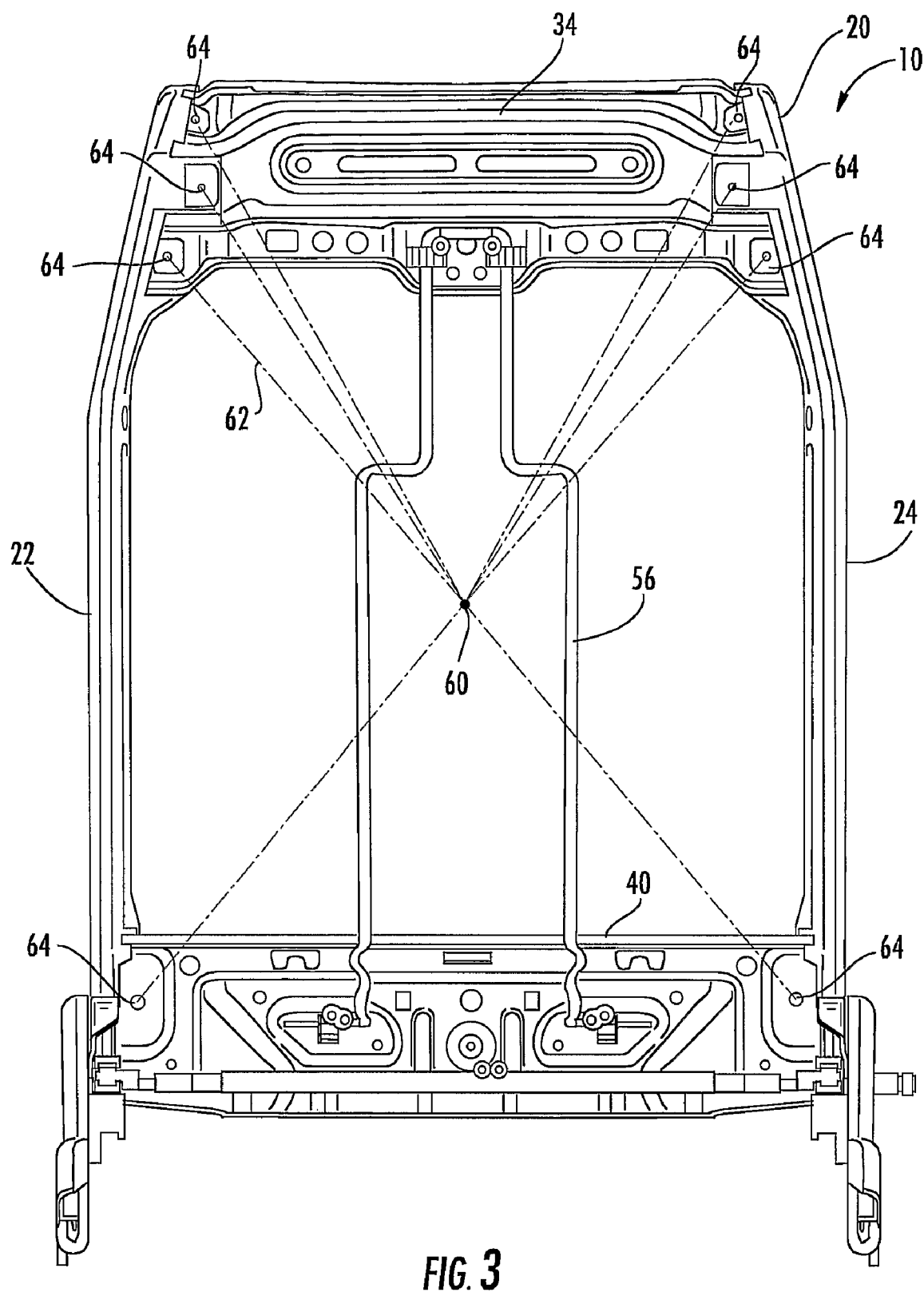
FIG. 3 is a front plan view of the seat frame system of FIG. 1 showing lines of sight between a work head and a plurality of weld spots according to an exemplary embodiment.
Figure 9:
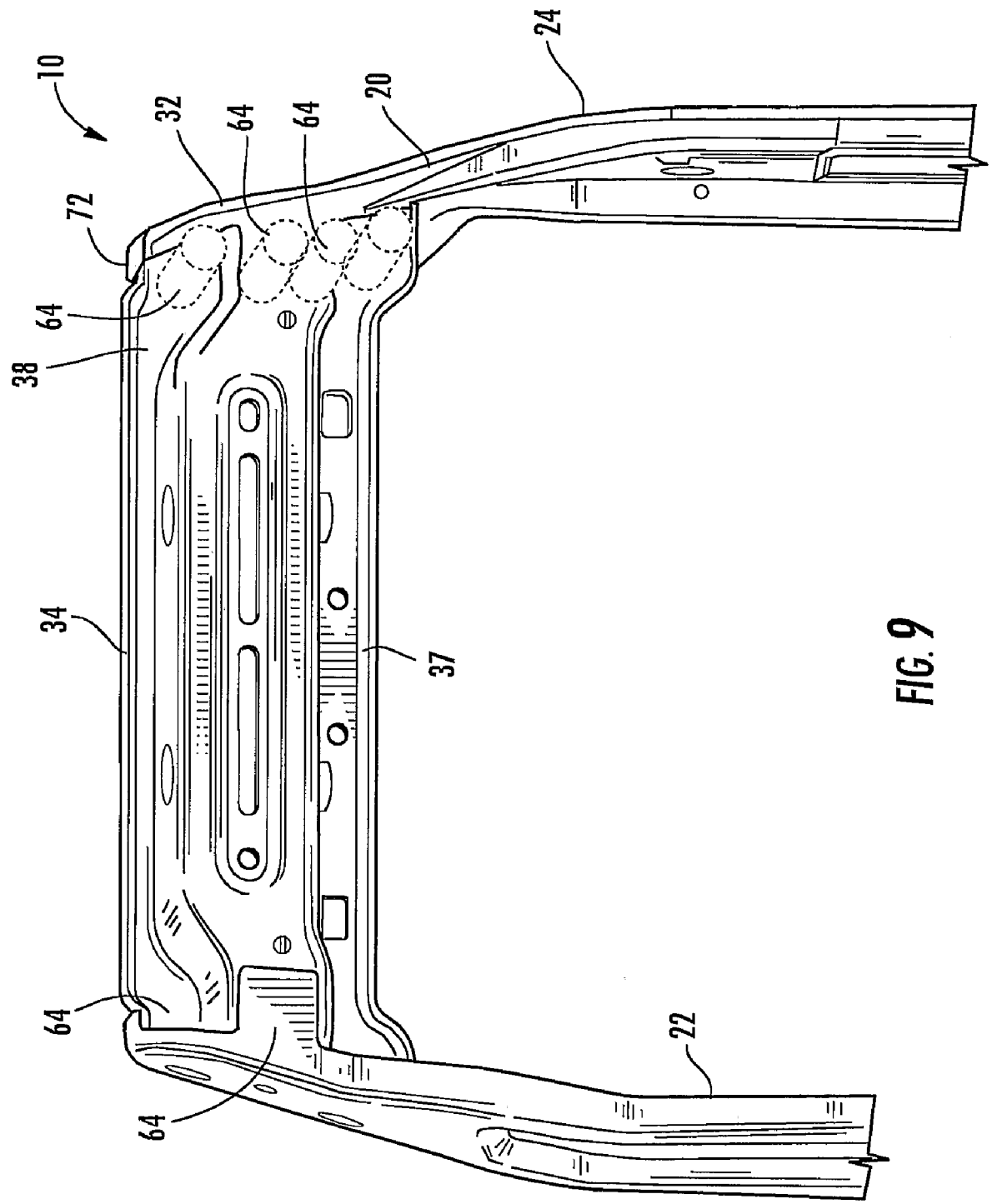
FIG. 9 is a partial perspective view of a front upper portion of the seat frame system of FIG. 1 showing the clearance zones for resistance spot welding tooling according to an exemplary embodiment.

Referring to FIGS. 3 and 9, side support members 22, 24 are coupled to first cross support member 34 and second cross support member 40 at a plurality of interfaces (e.g., coupling regions, weld zones, etc.), shown as weld spots 64. As can be appreciated, seat frame system 10 may have any number of weld spots 64. The number and/or the location of weld spots 64 may vary depending on factors such as the particular welding process used to weld frame 20, the materials being welded, the application in which frame 20 will be used, etc.

Figure 5:
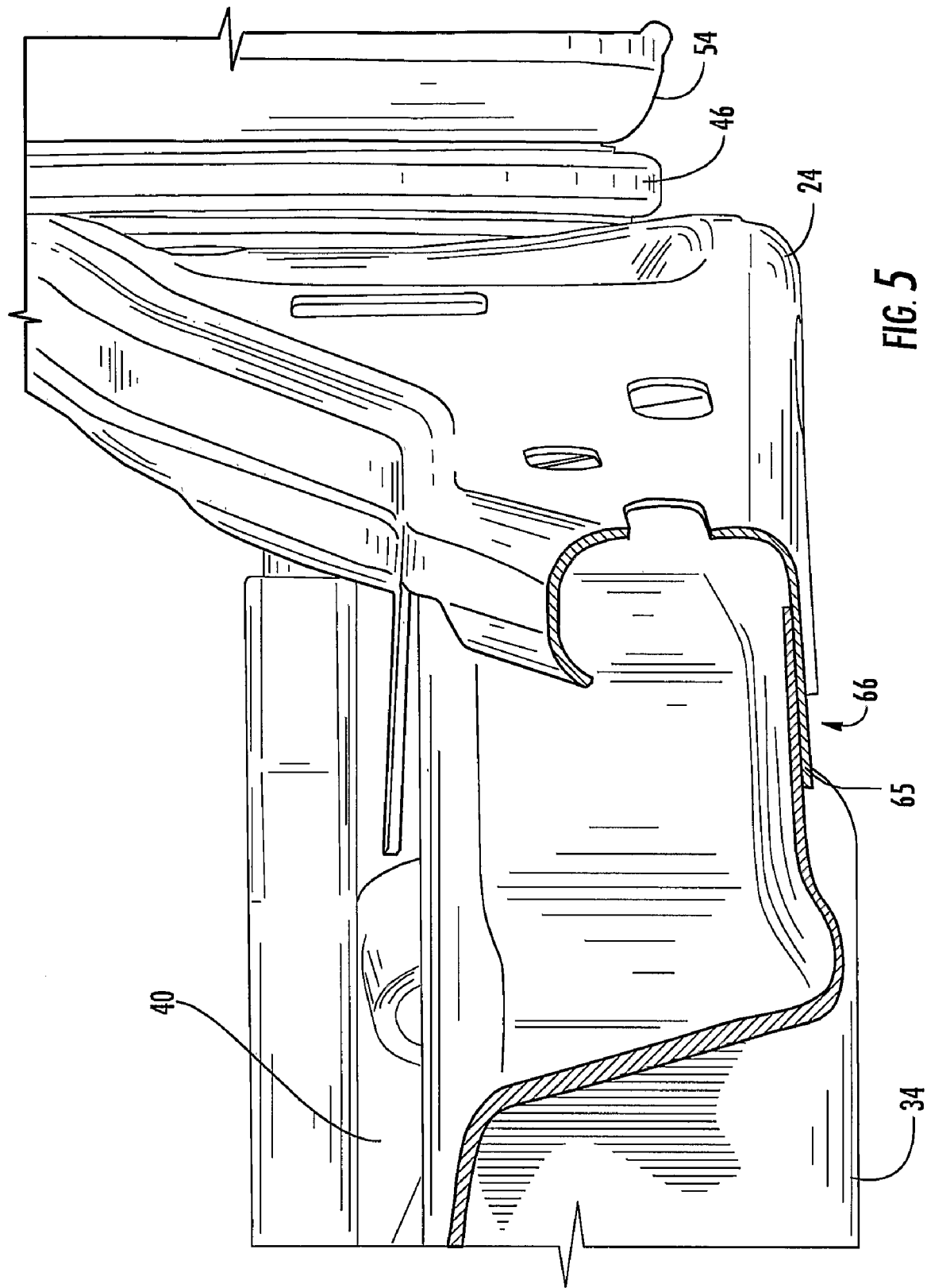
FIG. 5 is a partial cross sectional view of a top portion of the seat frame system taken along line 5-5 of FIG. 1 illustrating an upper portion of an intermediate weld spot according to an exemplary embodiment.
Figure 6:
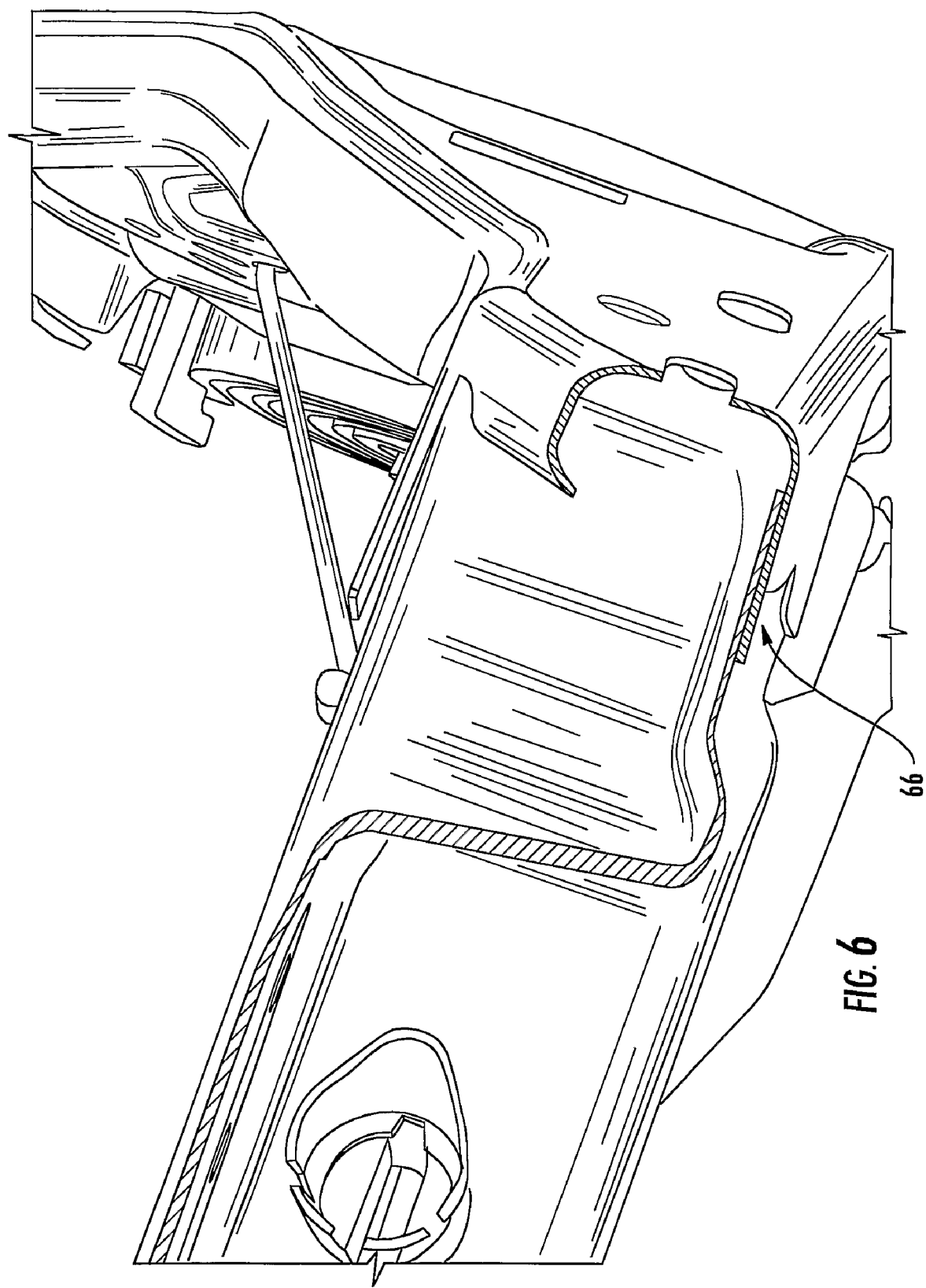
FIG. 6 is a partial perspective cross sectional view of the portion shown in FIG. 5.
Figure 7:
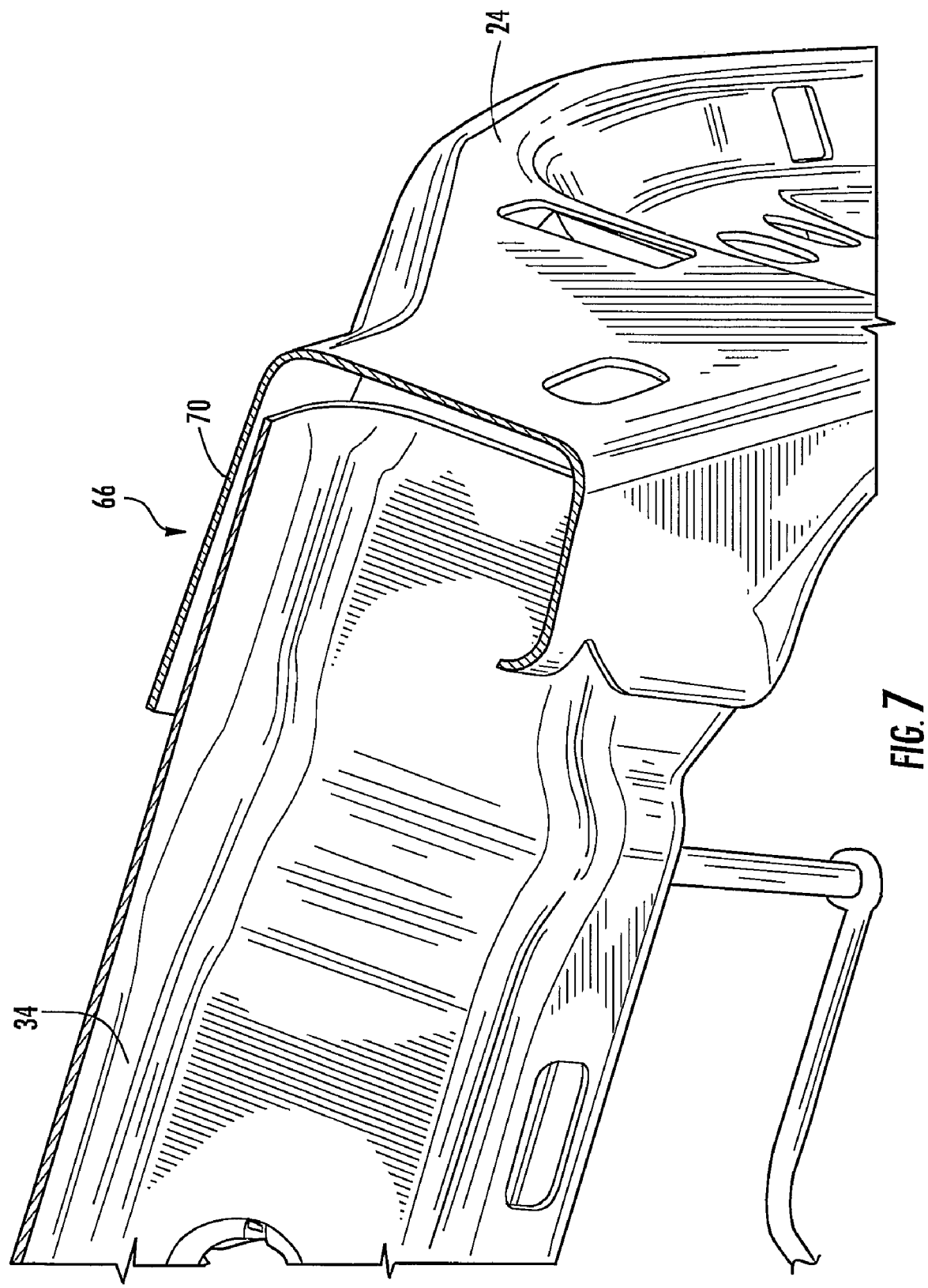
FIG. 7 is a partial cross sectional view of a top portion of the seat frame system taken along line 7-7 of FIG. 1 illustrating a lower portion of an intermediate weld spot according to an exemplary embodiment.

Welds spots 64 represent areas on frame 20 where side support members 22, 24, first cross support member 34, and second cross support member 40 are sufficiently manipulated during the selected welding process to form an integrated frame. According to a exemplary embodiment, at each weld spot 64, one of side support members 22, 24 and upper cross member 34 or second cross support member 40 is partially disposed over (e.g., overlaps, etc.) the other of side support members 22, 24 and upper cross member 34 or second cross support member 40. Such a configuration is illustrated in FIGS. 5 though 8.

Figure 8:
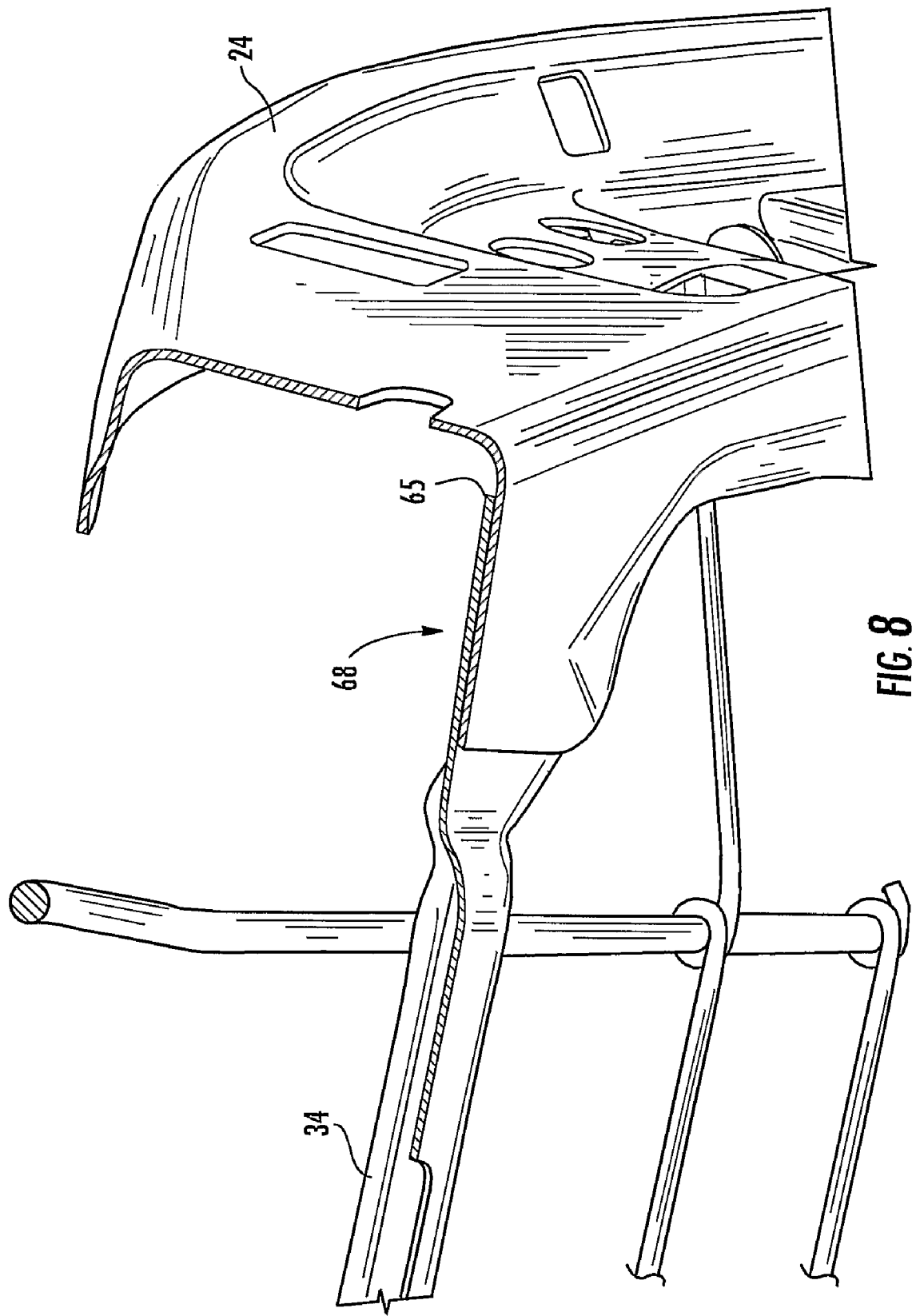
FIG. 8 is a cross sectional view of a top portion of the seat frame system taken along line 8-8 of FIG. 1 illustrating lower weld spot according to an exemplary embodiment.

Referring particularly to FIG. 8, a gap (not shown) is present between side support members 22, 24 and first cross support member 34 or second cross support member 40 at each weld spot 64 before frame 20 is welded. Prior to welding, the initial gap is reduced or minimized to a gap 65. As can be appreciated, the desired size (e.g., width) of gap 65 may vary depending on the welding process being used. One factor that may be relevant in determining the desired gap size is whether a filler material is being employed. As can be appreciated, a number of other factors may be relevant in determining the gap size. According to an exemplary embodiment, when a filler material is not being used (e.g., during a remote beam laser welding process, etc.), the desired size of gap 65 is less than approximately 0.3 mm. According to a particularly exemplary embodiment, when a filler material is not employed, the desired size of gap 65 is approximately 0.1 mm. As can appreciated, when a filler material is being employed, the desired size of gap 65 may be greater than 0.3 mm.

According to an exemplary embodiment, the desired size of gap 65 is achieved and maintained using a clamping device (not shown). With conventional welding processes (e.g., resistance spot welding, gas metal arc welding, etc.), the desired size of gap 65 is generally achieved using a relatively high pressure hydraulic clamping device (e.g., in resistance spot welding, the clamping force is generally applied at the welding tip). Such high pressure hydraulic clamping devices are often capable of displacing two or more relatively rigid members (e.g., conventional seat frame support members) until the desired size of gap 65 is achieved. However, hydraulic clamping devices are relatively slow acting, and with present technology are typically not fast enough to meet the demands of a remote beam laser welding system.

According to an exemplary embodiment, weld spots 64 are designed so that the desired size of gap 65 can be achieved and maintained employing a relatively fast-acting clamping device that does not have to be capable of providing the clamping force of a slower acting hydraulic clamping device. According to an exemplary embodiment, the desired size of gap 65 can be achieved and maintained using a pneumatic clamping device. As can be appreciated, pneumatic clamping devices are capable of operating relatively fast in comparison to hydraulic clamping devices, but with a lesser clamping force.

Figure 2:
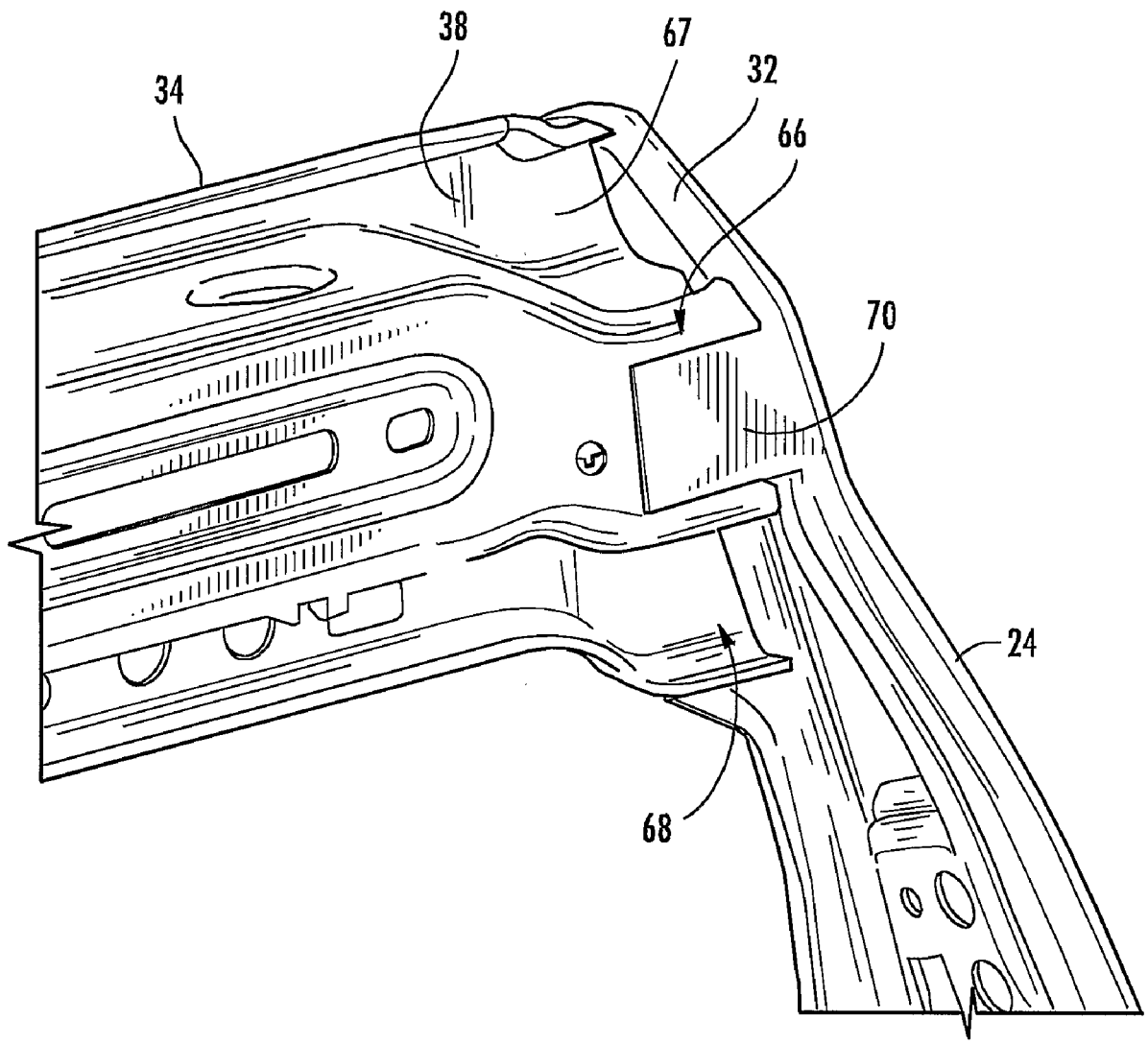
FIG. 2 is a partial perspective view of an upper corner portion of the seat frame system of FIG. 1 according to an exemplary embodiment.

FIG. 2 is a perspective view a corner of seat frame system 10 illustrating a plurality of weld spots 64 that have been individually referenced as weld spots 66, 67, and 68 respectively. For the sake of brevity, the configuration of weld spot 66 is described in detail herein. It should be noted that the other weld spots 64 of frame 20, including those individually referenced as weld spots 67 and 68, may have a similar configuration for enabling a lesser clamping force to provide and maintain the desired size of gap 65.

According to an exemplary embodiment, weld spot 66 is an interface between second end 32 of side support member 24 and second end 38 of first cross support member 34. According to the particular embodiment illustrated, side support member 24 includes a portion (e.g., member, platform, lip, flange, etc.), shown as a tab 70, configured to be welded to second end 38 of first cross support member 34. According to an exemplary embodiment, the portion or region of second end 38 interfaced with tab 70 is a relatively rigid portion. The rigidity of such portion may be similar to the rigidity of a conventional seat frame member. In such a configuration, tab 70 is less rigid (e.g., conformable, ductile, bendable, flexible, compliable, etc.) than the relatively rigid portion of first cross support member 34 to which tab 70 is to be welded. Prior to a welding process, a force is applied near and/or at tab 70 by a clamping device to draw (e.g., compress, press, displace, etc.) tab 70 and second end 38 together to achieve and maintain the desired size of gap 65. For such a configuration, the clamping device displaces tab 70 toward second end 38. The welded combination of tab 70 and second end 38 provides a weld structure suitable for use in a seating application.

According to an exemplary embodiment, the tab 70 is made of the same material as that of the member (e.g., side support member 24) of which it is a part. According to another exemplary embodiment, the tab is made from a material that differs from that used to form the member of which it is a part. It should also be noted that the tab may be integrally formed with the member or may be formed separately and coupled or attached to the member using fasteners (e.g., screws, bolts, adhesives, etc.) or the like.

The size, shape, and configuration of tab 70 is selected to facilitate welding of the tab to a member (e.g., first cross support member number 34). For example, the tab may have a thickness of between approximately 0.6 mm and 1.4 mm. The particular thickness of the tab may depend on a variety of factors, including the material chosen and other desired characteristics of the tab. According to an exemplary embodiment, the tab has a length and width that is selected to make the joint sufficiently compliable to allow it to be clamped to form a joint having a gap of less than approximately 0.2 mm. It will be appreciated by those reviewing this disclosure that many variations are possible for the length, width, and thickness of the tab depending on a variety of design considerations. It is intended that such variations fall within the scope of the various exemplary embodiments described herein.

As mentioned above, the remaining weld spots may have similar configurations. Each weld spot 64 includes at least one relatively rigid member that is mated with a corresponding relatively rigid less rigid member. For example, first and second cross support members 34, 40 may include a relatively rigid member while side support members 22, 24 may include a relatively less rigid portion, or side support members 22, 24 may include a relatively rigid portion while first and second cross support members include a relatively less rigid portion. According to another exemplary embodiment, first and second cross support members 34, 40 and side support members 22, 24 may include both a relatively rigid portion and a relatively less rigid portion that when welded include a weld structure suitable for use in a seating application.

Referring to FIG. 1, seat frame system 10 optionally includes additional members and/or components such as a recliner mechanism 46 configured to provided selective pivotal movement between the seat back and a seat base (not shown) against the force of a spring 47. Members 48, 50 may be used to couple recliner mechanism 46 to lower first ends 26, 28 of side support members 22, 24 respectively. Members 52, 54 may be used to couple recliner mechanism 46 to the seat base frame (not shown). According to an exemplary embodiment, members 48, 50 are integrally formed with side support members 22, 24, but according to other exemplary embodiments, may be provided as separate plates that are coupled to side support members 22, 24.

Frame 20 is configured to be covered by a padded, foam or cushioned layer (not shown), which may further be covered by a trim cover material such as leather, vinyl, and any other known or appropriate material. According to an exemplary embodiment, seat back frame system 10 further includes a wire 56, shown in FIGS. 3 and 4, extending longitudinally between upper support member 34 and lower support member 40. Wire 56 may be included to support seat springs, a lumber adjustment device, and/or padding (not shown). According to another exemplary embodiment, the wire may extend transversely between side support members 22, 24.

As mentioned above, side support members 22, 24, first cross support member 34, and second cross support member 40 of frame 20 are designed to be coupled together by a welding process. In one embodiment, frame 20 is designed to be coupled together by a remote beam laser welding process. According to another embodiment, and in contrast to conventional seat frames (which are generally designed to be exclusively welded together by one particular welding process), seat frame system 10 is advantageously configured so that frame 20 may be welded together using more than one welding process, and/or a combination of more than one welding process.

As can be appreciated, in certain applications, the use of one welding process may be more appropriate and/or more favorable than the use of another. As mentioned above, a remote beam laser welding system is significantly more expensive than the welding systems needed for the other welding processes. Accordingly, use of a remote beam laser welding system may not be economically feasible for every manufacturing environment. In addition, a manufacturing environment may already be established with one type of welding system, and changing over to another welding system may not be practical.

According to an exemplary embodiment, side support members 22, 24, first cross support member 34, and second cross support member 40 can be welded together to form frame 20 using any one of three welding process: remote beam laser welding; resistance spot welding; and/or gas metal arc welding (GMAW). The three welding processes may be used individually or may be used in combination with one or more of the other welding processes to weld frame 20. According to another exemplary embodiment, mechanical fasteners (e.g., bolts, rivets, pins, screws, etc.) may be used in combination with the selected welding process to couple together frame 20.

As can be appreciated, remote beam laser welding systems, resistance spot welding systems, and GMAW systems each include distinct tooling that requires seat frame system 10 to be designed to accommodate such tooling. In addition, the three welding processes each have certain limitations that have been accounted for in the design of seat frame system 10. Designing seat frame system 10 to be capable of being welded with all three welding processes mentioned above, advantageously allows for reduced development costs on multiple applications as well as allowing the manufacturer flexibility to determine the best low cost solution for each application.

FIGS. 3 through 7 illustrate frame 20 of seat frame system 10 as being designed to be welded together by a remote beam laser welding process. During a remote beam laser welding process, a laser beam is selectively directed (e.g., translated, moved, etc.) to weld spots 64 of frame 20 from a work head 60. Work head 60 includes a system (not shown) capable of selectively directing the laser beam onto the workpiece without substantially moving the work head (e.g., a mirroring device). A standoff distance 61 (FIG. 4) is provided between work head 60 and frame 20. Standoff distance 61 may vary depending on a number of factors including, but not limited to, the power of the laser, the type of material being welded, the size and design of frame 20, the constraints of the manufacturing environment, etc.

Figure 4:
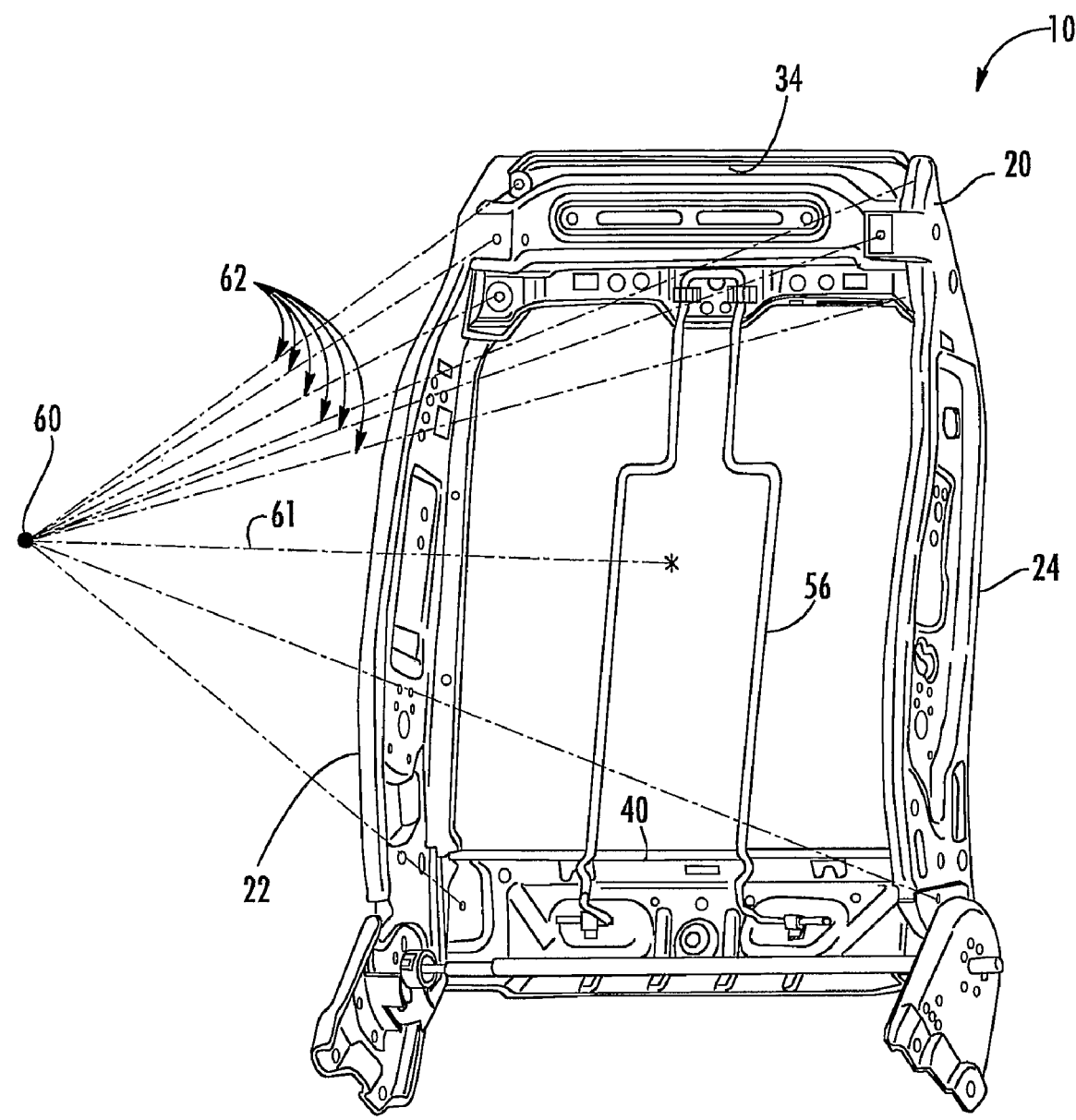
FIG. 4 is a perspective view of the seat frame system and lines of sight of FIG. 3.

According to an exemplary embodiment, seat frame system 10 is designed in a manner such that frame 20 is capable of being welded from a single plane as shown in FIG. 3 without requiring frame 20 and/or work head 60 to be substantially repositioned during the welding process. To provide such a configuration, each weld spot 64 is accessible by the laser while maintaining work head 60 and frame 20 in a substantially fixed position. As shown in FIGS. 3 and 4, the "line of sight" (i.e., a line extending between work head 60 and weld spots 64 that represents the laser path to each weld spot 64 from work head 60) is unobstructed for each weld spot 64. The line of sight for each weld spot 64 is illustrated in FIGS. 3 and 4 as lines 62. An obstructed line of sight may prevent the laser from reaching weld spots 64. Common obstructions that may interfere with the line of sight include, but are not limited to, portions of the support members, clamping structures, fixtures, and the like.

According to an exemplary embodiment, a method of manufacturing seat frame system 10 by a remote beam laser welding process includes the step of providing a remote beam laser welding system. The remote beam laser welding system includes work head 60 operably coupled to a laser generating source (not shown). According to an exemplary embodiment, the laser generating source is a $CO_2$ laser having a power level of around 2 kilowatts (kW) or greater. According to a particular exemplary embodiment, a laser having a power level is in the range of approximately 3 kW to 6 kW may be utilized.

Work head 60 includes a mirroring device (not shown) configured to selectively and effectively move (e.g., position, direct, etc.) the laser beam to each weld spot 64 on frame 20. Referring to FIG. 4, standoff distance 61 is provided between work head 60 and frame 20. According to an exemplary embodiment, standoff distance 61 is approximately one meter. According to various other exemplary embodiments, standoff distance 61 may differ based on the factors provided above.

The method further includes the step of applying a clamping force near and/or at each weld spot 64. The clamping force is intended to draw frame 20 together at weld spots 64 an amount sufficient to achieve and maintain a desired gap 65. According to an exemplary embodiment, a pneumatic clamping device is used to provide the clamping force. For such a configuration, the pneumatic clamping device is used to achieve and maintain gap 65 having a size less than approximately 0.3 mm. According to an exemplary embodiment, the pneumatic clamping device is used to achieve and maintain gap 65 having a size of approximately 0.1 mm. It has been contemplated that improvements in laser welding technology may allow for the size of gap 65 to be increased. Accordingly, increased gap sizes are within the scope of this disclosure. A force measuring system may be employed to measure the clamping force being applied to each weld spot 64. By knowing the magnitude of the clamping force applied to a weld spot 64, the gap width between the support members can be determined. Any number of a variety of force measuring systems may be used, such as a strain gauge/load cell.

The method further includes the step of selectively directing the laser beam from work head 60 to each weld spot 64. While the order in which each weld spot 64 is welded may vary, according to an exemplary embodiment, the laser beam is directed to each weld spot 64 in a relatively continuous movement (e.g., in a clockwise or a counterclockwise fashion, in a substantially linear fashion, etc.). At each weld spot 64, the laser beam welds the respective support members together to provide a seat frame suitable for a vehicle application. The weld pattern created at each weld spot 64 by the laser beam may vary depending on the application. Examples of suitable weld patterns are disclosed in co-pending U.S. Provisional Application No. 60/623,284 filed Oct. 29, 2004 and International Patent Application No. PCT/US2005/038822 filed Oct. 27, 2005, both of which are herein incorporated be reference in their entirety.

As mentioned above, seat frame system 10 is equally suitable for a manufacturing process wherein frame 20 is to be welded together using a resistance spot welding process. A resistance spot welding process is a conventionally known welding process commonly used to weld together seat frames. In conventional seat frame systems, if a seat frame is welded together using a resistance spot welding process, the seat frame has been designed to be exclusively welded by such welding process.

Similar to a remote beam laser welding process, during a resistance spot welding process, side support members 22, 24 must be held together with first cross support section 34 and/or second cross support section 40 with a sufficient force to achieve and maintain the desired size of gap 65. Since resistance spot welding is a significantly slower welding process than a remote beam laser Welding process, hydraulic clamping devices may be used to apply the clamping force near and/or at weld spots 64. As can be appreciated, since weld spots 64 are configured in a manner that allows the desired size of gap 65 to be achieved and maintained with a pneumatic clamping device to accommodate a remote beam laser welding system, a pneumatic clamping device may optionally be used in place of, or in combination with, a hydraulic clamping device during the resistance spot welding process.

FIGS. 9 through 12 illustrate that frame 20 of seat frame system 10 is designed with sufficient clearance zones (i.e., the space needed to conduct the welding operation) that are required to provide access to weld spots 64 for conventionally known resistance spot welding tooling employed during a resistance spot welding process such as weld tips (not shown). Cylinders 72 (shown with dotted lines) represent the clearance zones required for conventional weld tips employed during a resistance spot welding process. As shown, clearance zones are provided on both a front surface 37 (shown in FIG. 9) and a rear surface 39 (shown in FIG. 10).

Figure 10:
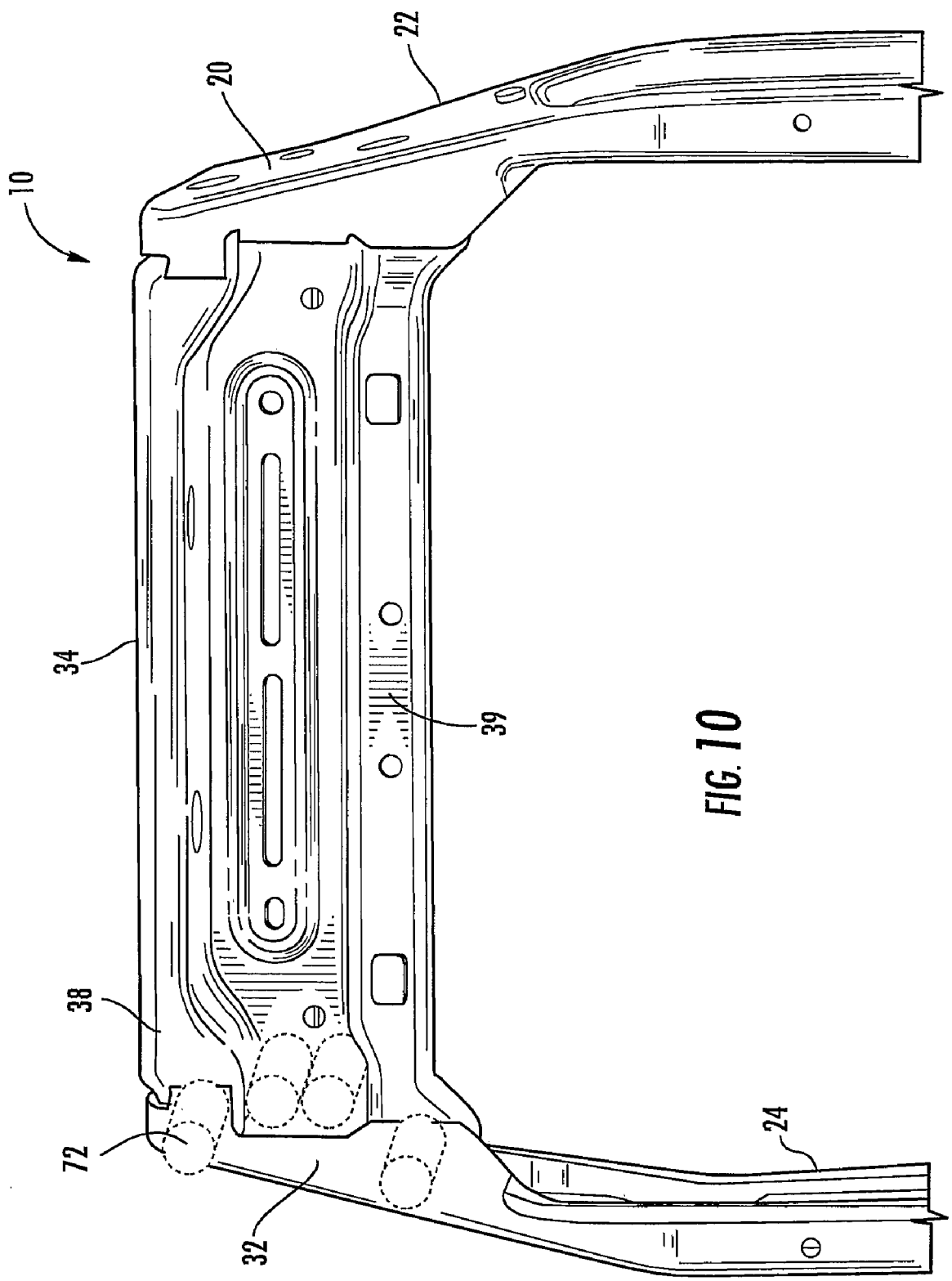
FIG. 10 is a partial perspective view of a rear upper portion of the seat frame system of FIG. 1 showing the clearance zones for resistance spot welding tooling according to an exemplary embodiment.

Referring first to FIGS. 9 and 10, a weld spot 64 between second end 38 of upper support member 34 and upper end 32 of side support member 24 is illustrated according to an exemplary embodiment. FIG. 9 illustrates clearance zones 72 from surface 37 of peripheral frame 20, while FIG. 10 illustrates clearance zones 72 from rear surface 39 of peripheral frame 20.

Figure 11:
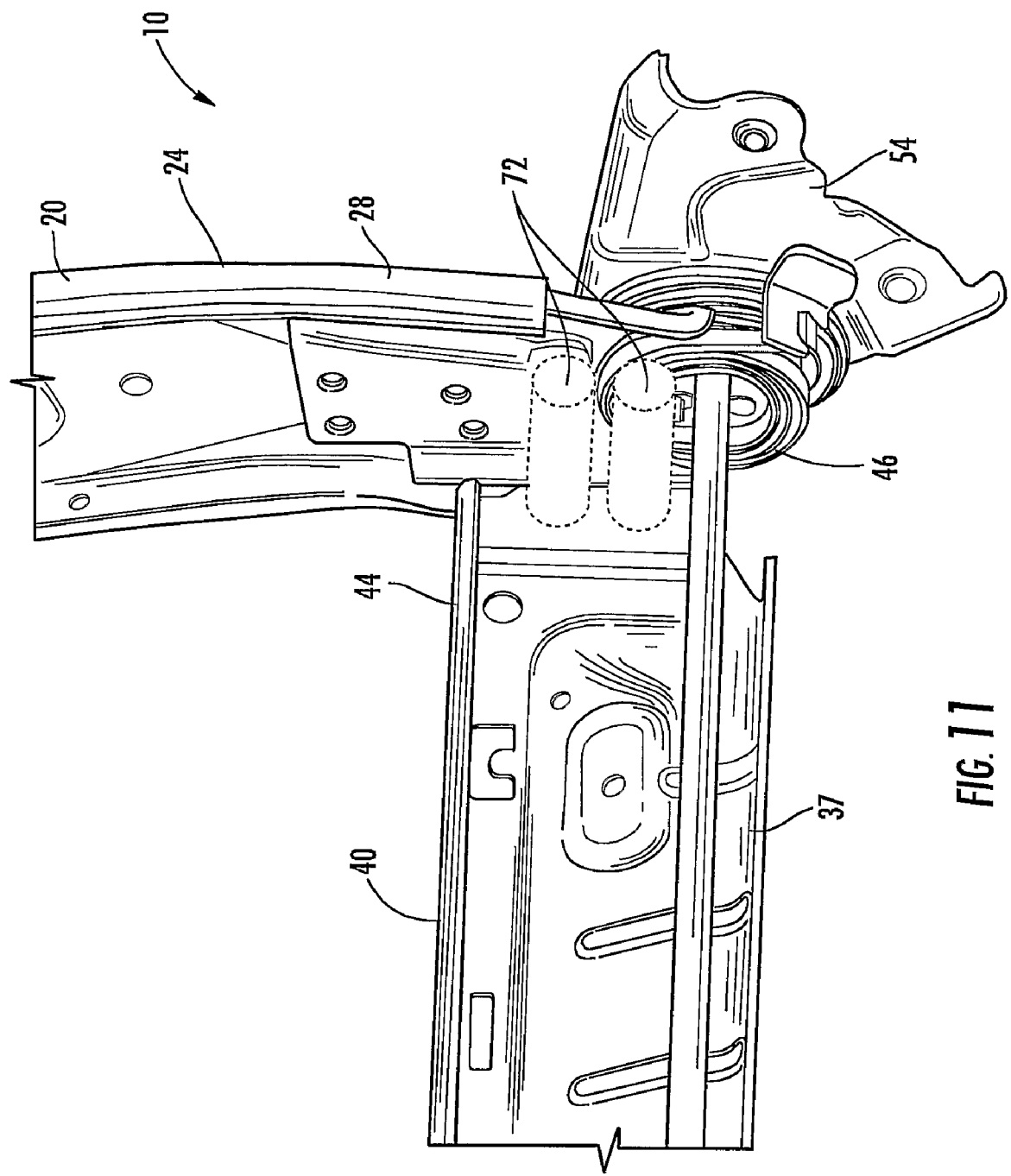
FIG. 11 is a partial perspective view of a front lower corner portion of the seat frame system of FIG. 1 showing the clearance zones for resistance spot welding tooling according to an exemplary embodiment.
Figure 12:
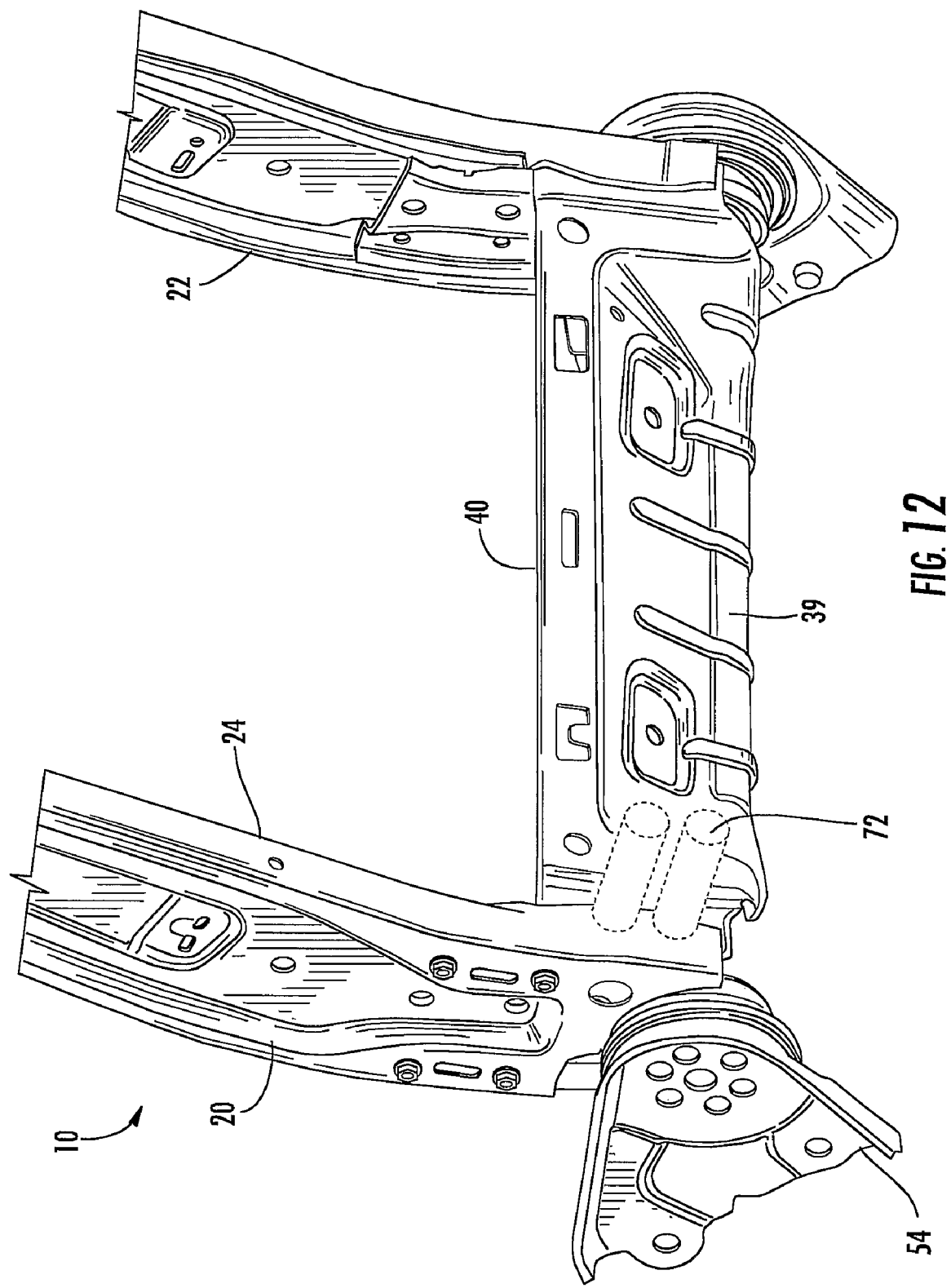
FIG. 12 is a partial perspective view of a rear lower portion of the seat frame system of FIG. 1 showing the clearance zones for resistance spot welding tooling according to an exemplary embodiment.

Referring to FIGS. 11 and 12, a weld spot 64 between second end 44 of lower support member 40 and lower end 28 of side support 24 is illustrated. FIG. 11 illustrates clearance zones 72 from front surface 37 of peripheral frame 20, while FIG. 12 illustrates clearance zones 72 from rear surface 39 of peripheral frame 20.

Seat frame system 10 further allows for all of the welding to be done from one side of the peripheral frame 20 without having to turn the frame over or otherwise move the frame during the resistance spot welding process.

As mentioned above, seat frame system 10 is equally suitable for a manufacturing process wherein frame 20 is to be welded together using a gas metal arc welding (GMAW) process. Like resistance spot welding, GMAW is a conventionally known welding process commonly used to weld together seat frames. In conventional seat frame systems, if a seat frame is welded together using a GMAW process, the seat frame has been designed to be exclusively welded by such welding process.

During a GMAW process, side support members 22, 24 must be held together with first cross support section 34 and/or second cross support section 40 with a sufficient force to achieve and maintain the desired size of gap 65. Since GMAW is a significantly slower welding process than a remote beam laser welding process, hydraulic clamping devices may be used to apply the clamping force near and/or at weld spots 64. As can be appreciated, since weld spots 64 are configured in a manner that allows the desired size of gap 65 to be achieved and maintained with a pneumatic clamping device to accommodate a remote beam laser welding system, a pneumatic clamping device may optionally be used in place of, or in combination with, a hydraulic clamping device during the GMAW process.

Frame 20 of seat frame system 10 is designed to provide sufficient clearance for conventionally known tooling (e.g., torches, etc.) used during a GMAW process. According to one embodiment, in order to weld frame 20 using a GMAW process, the frame member must be turned, rotated, flipped over, or otherwise moved during the welding process in order reach certain weld spots 64. As can be appreciated, other exemplary embodiments may be configured so that frame 20 may be welded from one side using a GMAW process.

Figure 13:
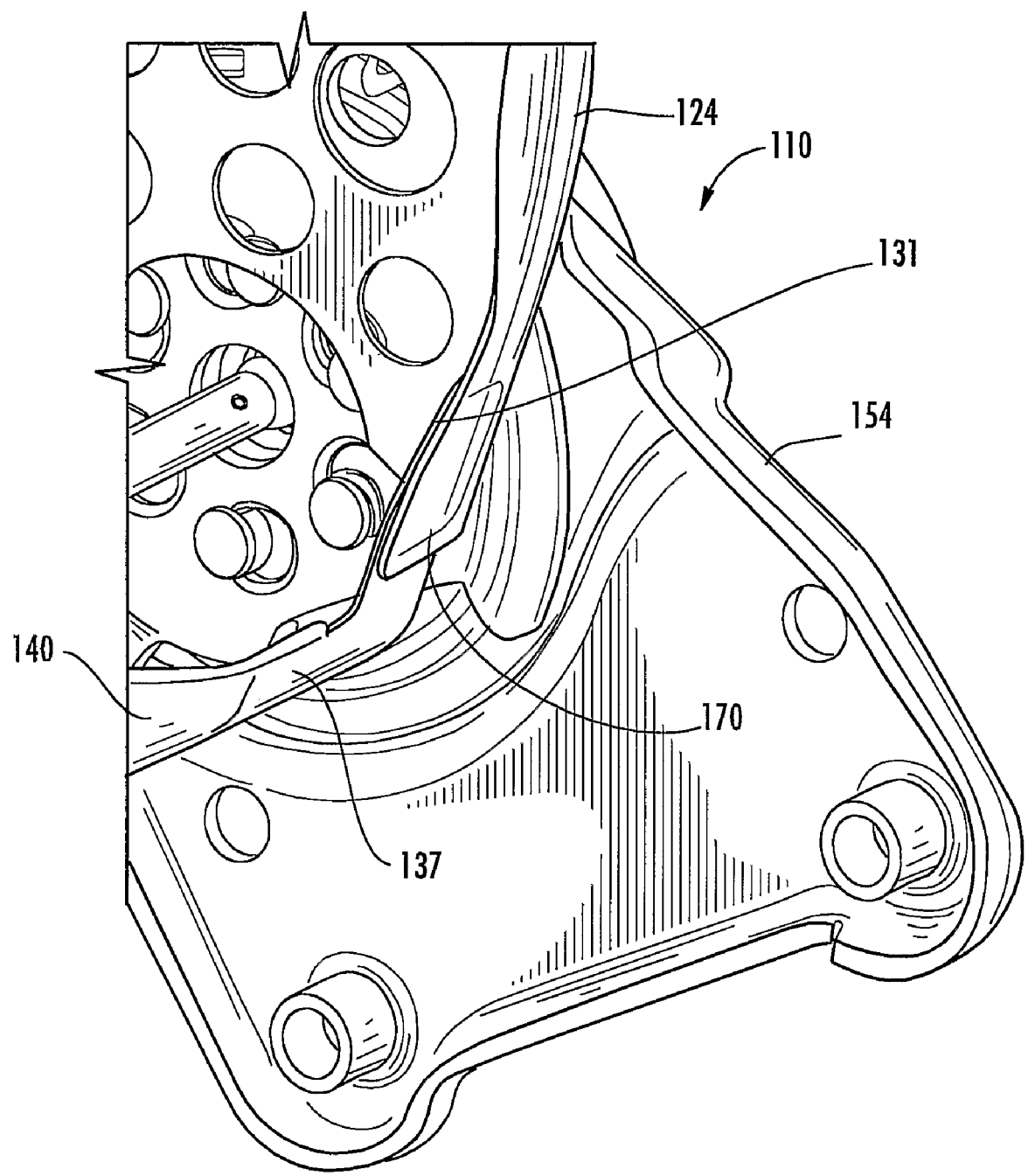
FIG. 13 is a partial perspective view of a front lower portion of a seat frame system according to an exemplary embodiment.
Figure 14:
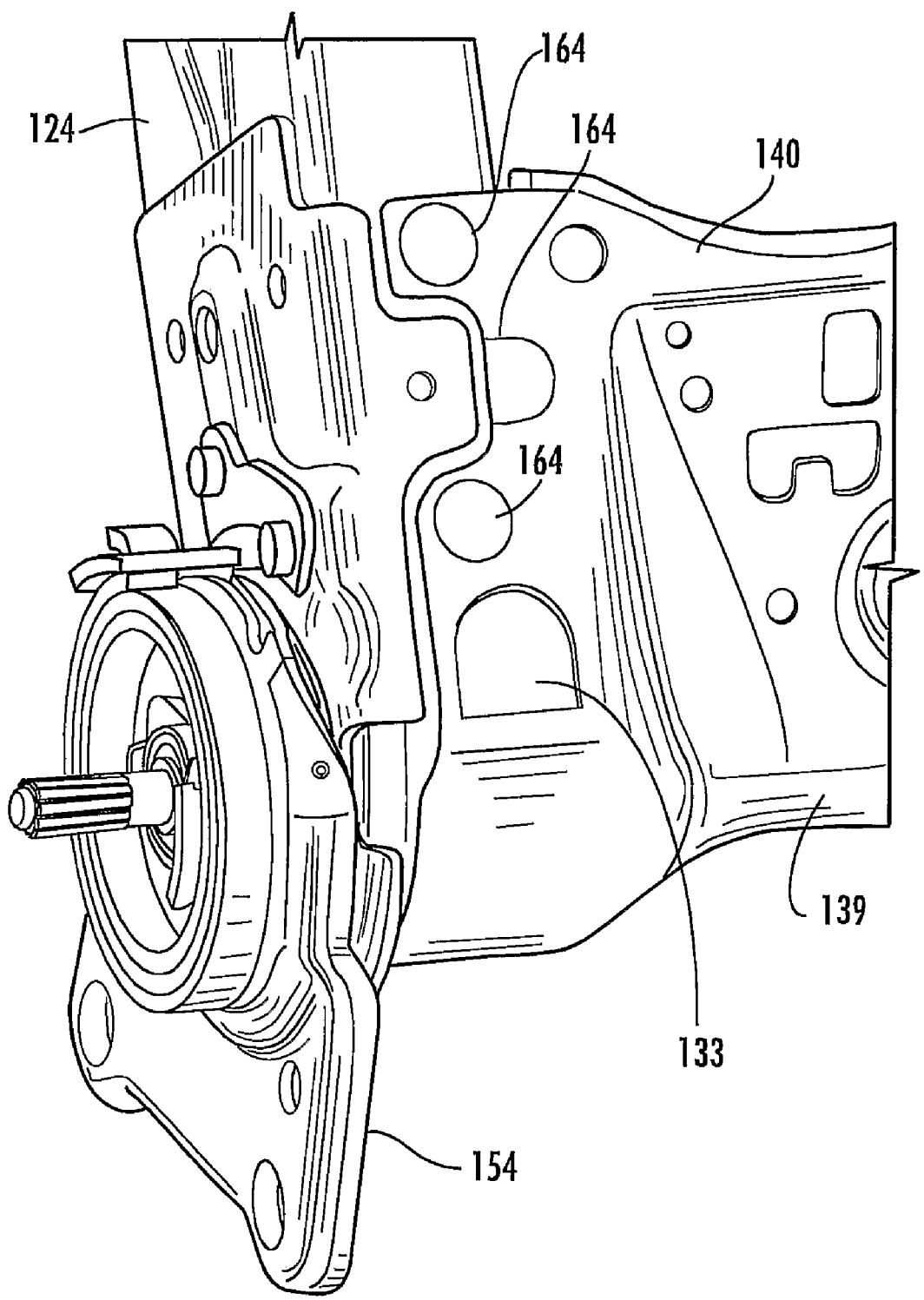
FIG. 14 is another partial perspective view of the rear lower portion of the seat frame system shown in FIG. 13.
Figure 15:
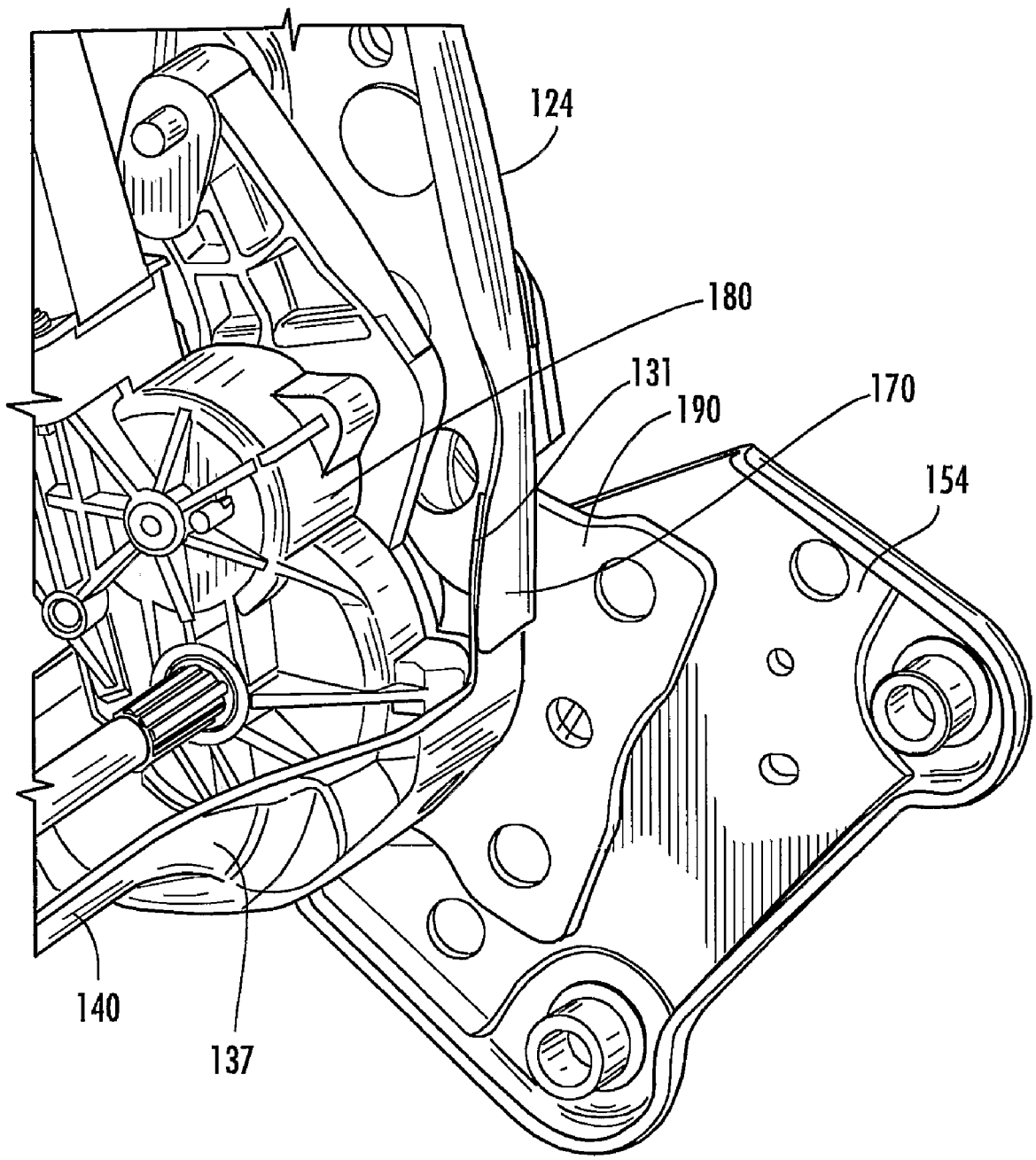
FIG. 15 is another partial perspective view of the front lower portion of the seat frame system shown in FIG. 13 illustrating a power recliner motor installed on the seat frame system according to an exemplary embodiment.

According to an exemplary embodiment, the various members of a seat frame system may be configured to allow welding of the members without the need to move the members during the welding process. An exemplary embodiment of features provided to enable such a welding operation to take place is illustrated in FIGS. 13-15. As shown in FIG. 13, a portion of a seat frame system 110 includes a side support member 124 welded to a lower cross support member 140 adjacent a member 154 (similar to that shown as member 54 in FIG. 1). The side support member 124 is welded to a portion 131 of the lower cross support member 140 at a front surface 137 thereof. A member of element 131 in the form of an extension or flange extends upward from the main body of the lower cross support member 140. Side support member 124 includes a tab 170 configured to be provided against the member 131 during a welding operation. tab 170 is then welded to member 131 to secure side support member 124 to lower cross support member 140.

As illustrated in FIG. 14, lower cross support member 140 is welded to side support member 124 at a number of weld spots 154 at a rear surface 139 of lower cross support member 140. Weld spots 154 illustrated in FIG. 14 are formed from a laser arranged behind lower cross support member 140 (i.e., the laser originates from a point above the plain of the paper). To avoid the need to move side support member 124 and lower cross support member 140 during the welding operation, an aperture or hole 133 is provided in rear surface 139 of lower cross support member 140 to allow the laser beam to have a line of sight with member 131. That is, the laser beam travels through aperture 133 toward a rear surface of member 131 to weld member 131 to tab 170.

As shown in FIG. 15, a power recliner motor 180 for a recliner mechanism may be mounted to seat frame system 110 subsequent to the welding of member 131 to tab 170. Motor 180 is mounted in seat frame system 110 after member 131 is welded to tab 170, since otherwise it would block the line of sight from the rear of seat frame system 110 for the laser beam to weld member 131 and tab 170. A bracket 190 is also shown in FIG. 15 that may be welded to side frame member 124 as will be described below with respect to FIG. 16.

Figure 16:
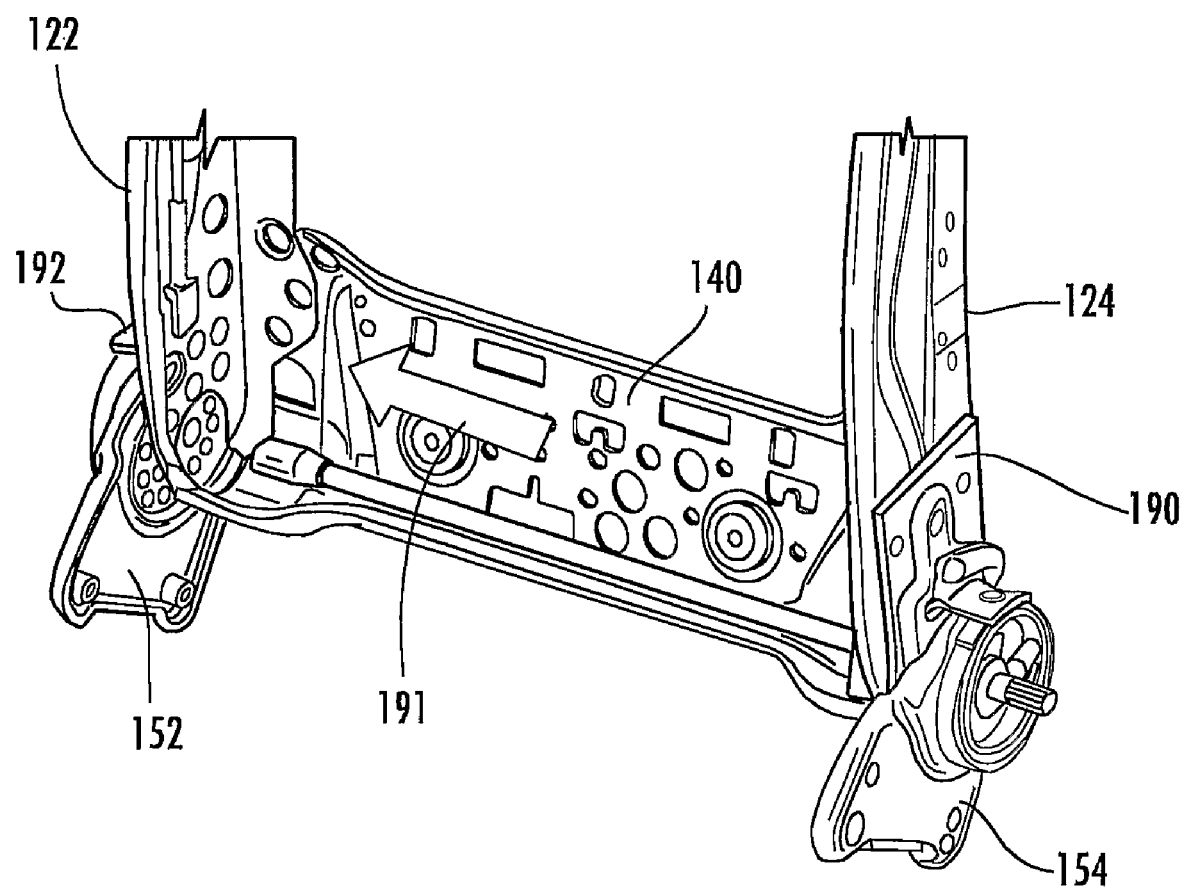
FIG. 16 illustrates a partial perspective view of a seat frame system having a recliner mechanism mounted on the outer sides of the seat frame system according to an exemplary embodiment.

Seat frame system 110 is configured such that any of a variety of welding processes may be utilized to weld the various components together. As shown in FIG. 16, brackets 190 and 192 are provided adjacent side frame seat members 124 and 122, respectively. Brackets 190 and 192 are welded to their respective side frame members such that the laser beam first impinges the thinner of the two members to be welded first. For example, as shown in FIG. 16, side frame member 122 is thinner than bracket 192 according to an exemplary embodiment. Accordingly, the direction of laser beam travel (illustrated as arrow 191) is from left to right as shown in FIG. 16, such that the laser first impinges side frame member 122. To weld bracket 190 to side frame member 124, the laser beam would first impinge side frame member 124, since side frame member 124 is thinner than bracket 190 according to an exemplary embodiment.

Figure 18:
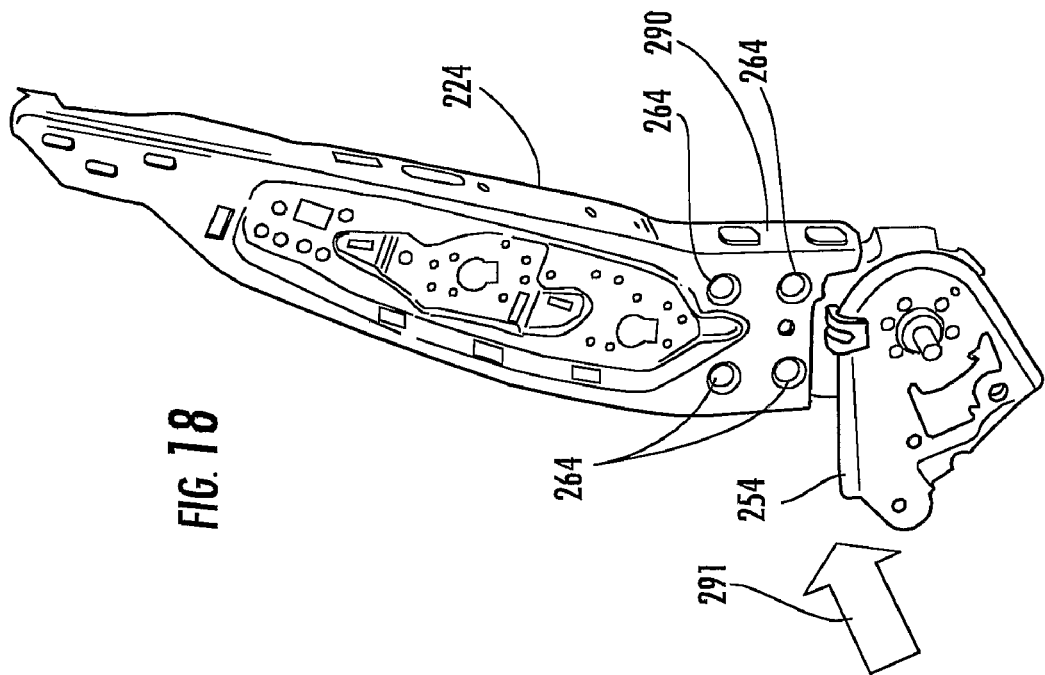
FIGS. 17 and 18 are partial perspective views of a portion of a seat frame, system illustrating the installation of a recliner mechanism on an inner side of the seat frame system according to an exemplary embodiment.
Figure 17:
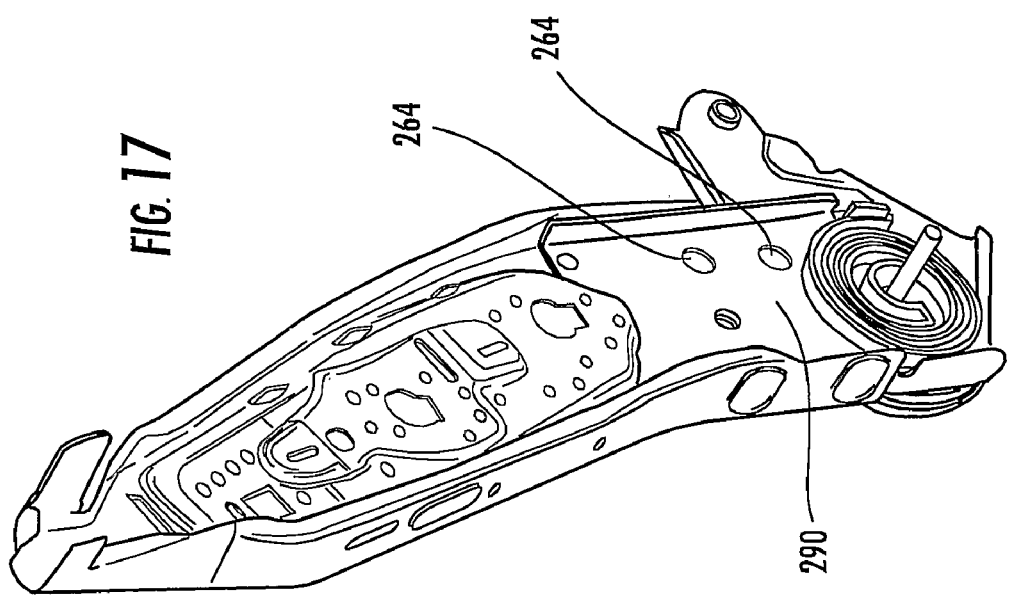

While FIG. 16 is illustrated with respect to a seat frame system 110 having a recliner mechanism mounted toward the outside of the seat frame system, FIG. 17 illustrates an exemplary embodiment in which a recliner mechanism may be mounted toward the inside of a seat frame system. As shown in FIGS. 17-18, a bracket 290 is welded to a side frame member 224 at a plurality of weld spots 264 adjacent a member 254. Again, since side frame member 224 has a lesser thickness than brackets 290, the laser beam will ideally impinge side frame member 224 first, as indicated by arrow 291 shown in FIG. 18. It should be noted that while FIGS. 16-18 have been described with respect to the use of a laser welding system, other welding processes may also be used for welding the various components together, as will be appreciated by those reviewing this disclosure.

It will be appreciated by those reviewing this disclosure that various features have been described with respect to various exemplary embodiments, and that features described in conjunction with one or more embodiments may also be utilized with other exemplary embodiments.

According to one embodiment, a seat assembly for use in a vehicle includes a seat bottom and a seat back. At least one of the seat bottom and seat back includes a seat frame comprising a first support member and a second support member adapted to be coupled together using a remote beam laser welding process at a weld spot. The weld spot is defined by a relatively rigid portion of one of the first support member and the second support member, and a relatively less rigid portion of the other of the first support member and the second support member. The relatively less rigid portion is sufficiently movable to allow a fast-acting clamping device to provide a desired gap width between the first support member and the second support member. According to an exemplary embodiment, the desired gap width may be achieved using a pneumatic clamping device.

According to another embodiment, a seat frame includes a pair of side support members and a cross support member that are configured to be coupled together using a welding process. The seat frame is designed in a manner such that the cross support member can be welded to the side support members using a remote beam laser welding process. The cross support member and the side support members are welded at a plurality of weld spots accessible by a remote beam laser welding system from one side of the seat frame without requiring a the support members or the work head of the remote beam laser welding system to be significantly repositioned during the welding process.

According to another embodiment, a seat frame system for a vehicle includes a pair of side support members and at least one cross support member coupled together using a welding process. The seat frame system is designed to be welded by any one of a remote beam laser welding process, a resistance spot welding process, and/or a gas metal arc welding process.

According to another embodiment, a method of manufacturing a seat frame system having multiple support members that together define a frame includes the steps of aligning the support members to provide a plurality of weld spots, and applying a clamping force near and/or at each weld spot to draw the support members together until a desired gap size is achieved and maintained. According to one embodiment, the desired gap size is within the range of approximately 0 mm to 0.3 mm. According to another embodiment, the desired gap size is approximately 0.1 mm. The method further includes the step of positioning the frame at a standoff distance from a work head of a remote laser beam system. The method further includes the step of welding each weld spot with a laser beam being directed from the work head without having to substantially reposition the frame and/or the work head during the welding process.

According to another embodiment, a method of manufacturing a seat frame system includes the steps of providing a seat frame system that can be welded together using any one of a remote beam laser welding process, a resistance spot welding, and/or a gas metal arc welding process. The method further includes the steps of selecting a welding process from a group comprising a remote beam laser welding process, a resistance spot welding process, and a gas metal arc welding process, and welding the seat frame system with the selected welding processing without modifying the configuration of the seat frame system.

It is important to note that the construction and arrangement of the elements of the seat frame system as shown in the various exemplary embodiments are illustrative only. Although only a few embodiments of the present invention have been described detailed in this disclosure, those skilled in the art who review and understand this disclosure will readily appreciate that many modifications are possible (e.g., variations in sizes, dimensions, structures, shapes and proportions of the various elements, values of parameters, mounting arrangements, materials, colors, clamping arrangements, orientations, etc.) without materially departing from the novel teachings and advantages of the subject matter recited in the claims. For example, the materials used for the support members of seat frame system 10 and other structural components shown in the FIGURES can be selected from those known and unknown to the art, including steel, various other alloys, or high strength metals such as stainless steel and steel alloys. In particular, side support members 22, 24, first cross support member 34, and second cross support member 40 are made from materials required to meet the OEM or regulatory requirements. Accordingly, all such modifications are intended to be included within the scope of the present invention as defined in the appended claims. The order or sequence of any process or method steps may be varied or re-sequenced according to alternative embodiments unless expressly limited. Other substitutions, modifications, changes and/or omissions may be made in the design, operating conditions and arrangement of the exemplary embodiments without departing from the scope of the present invention as expressed in the appended claims.

What is claimed is:

1. A seat frame for a vehicle comprising:
   a first seat frame member;
   a second seat frame member having a body portion and a first flexible member extending from the body portion, such that the first flexible member is welded to the first seat frame member at a weld spot to couple the second seat frame member to the first seat frame member, and one of the first seat frame member and the second seat frame member is less rigid at the weld spot; and
   wherein the weld spot is an interface between a second end of the first seat frame member and the first flexible member, such that the weld spot is in a line of sight of a laser beam from a work head of a welder, and the orientation of the seat frame is fixed with respect to the work head during the welding process.

2. The seat frame of claim 1, further comprising a plurality of weld spots on the second frame member, wherein each of the weld spots are contained within a single plane during the welding process.

3. The seat frame of claim 2, wherein the tab has a thickness of between approximately 0.6 and 1.4 mm.

4. The seat frame of claim 2, wherein the tab is integrally formed with the second seat frame member.

5. The seat frame of claim 1, further comprising a gap having a predetermined size located between the first seat frame member and the first flexible member of the second seat frame member and formed by a clamping device.

6. The seat frame of claim 1, wherein the second seat frame member is a side support member and the first seat frame member is a cross support member for a vehicle seat frame.

7. The seat frame of claim 1, wherein the second seat frame member is a cross support member and the first seat frame member is a side support member for a vehicle seat frame.

8. The seat frame of claim 1, further comprising a third seat frame member, wherein the second seat frame member comprises a second flexible member welded to the third seat frame member at a second location to couple the second seat frame member to the third seat frame member, the second seat frame member extending between the first seat frame member and the third seat frame member.

9. The seat frame of claim 1, wherein the first flexible member and the second seat frame member are made of the same material.

10. The seat frame of claim 9, wherein the material is a steel.

11. The seat frame of claim 1, wherein the second member comprises an aperture at a second location that is configured to provide a line of sight for a laser beam directed at the first location.

12. The seat frame of claim 1, wherein the first flexible member of the second seat frame member is configured to be coupled to the first seat frame member using one or more welding processes selected from the group consisting of resistance spot welding, gas metal arc welding, and remote beam welding.

13. The seat frame of claim 1, wherein the seat frame comprises a vehicle seat back.

14. A method for producing a seat frame comprising:
   providing a first support member;
   providing a second support member adjacent the first support member, the second support member having a flexible member extending therefrom that is less rigid than the second support member;
   applying a clamping force at a first location to clamp the flexible member to the first support member;
   laser welding the flexible member to the first support member at weld spot to couple the second support member to the first support member; and
   wherein the weld spot is an interface between a second end of the first support member and the flexible member, such that the weld spot is in a line of sight of a laser beam from a work head of a welder, and the orientation of the seat frame is fixed with respect to the work head during the welding process.

15. The method of claim 14, wherein the first flexible member comprises a tab extending from the second seat frame member.

16. The method of claim 14, wherein the step of applying a clamping force utilizes a pneumatic clamping device.

17. The method of claim 14, wherein the step of welding the relatively flexible member to the first support member comprises directing a laser beam from a remote beam laser system to the first location.

18. The method of claim 17, wherein at least one of the first support member and the second support member comprise an aperture and the step of directing a laser beam comprises directing the laser beam through the aperture to the first location.

19. The method of claim 14, wherein the step of welding the relatively flexible member to the first support member comprises utilizing at least one of a resistance spot welding process and a gas metal arc welding process.

20. The method of claim 14, wherein the second support member is a side support member and the first support member is a cross support member for a vehicle seat frame.

21. The method of claim 14, wherein the second support member is a cross support member and the first support member is a side support member for a vehicle seat frame.

22. The method of claim 14, further comprising providing a third support member and a fourth support member, welding the second support member to the third support member at a second location such that the second support member extends between the first support member and the third support member, and welding the fourth support member to the third support member at a third location and to the first support member at a fourth location such that the fourth support member extends between the first support member and the third support member.

23. The method of claim 22, wherein the steps of welding at the first location, second location, third location, and fourth location are performed without moving the first support member, second support member, third support member, and fourth support member.

24. The method of claim 22, wherein the welding steps are performed in the following order: welding at the first location, welding at the second location, welding at the third location, and welding at the fourth location.

25. The method of claim 14, wherein the step of providing the second support member adjacent the first support member comprises providing the relatively flexible member over a portion of the first support member.

26. The method of claim 14, further comprising providing a bracket adjacent the second support member at a second location and welding the bracket to the second support member using a remote beam laser device.

27. The method of claim 26, wherein the bracket has a first thickness at the second location and the second support member has a second thickness at the second location, the first thickness being greater than the second thickness, wherein the step of welding the bracket to the second support member comprises directing a laser beam toward the second location such that it first impinges the second support member.

28. The method of claim 14, wherein the first support member, the second support member, and the flexible member each comprise a steel material.

* * * * *